(No Model.)
F. B. RAY.
COCK OR FAUCET.
No. 401,588. Patented Apr. 16, 1889.
Fig. I.
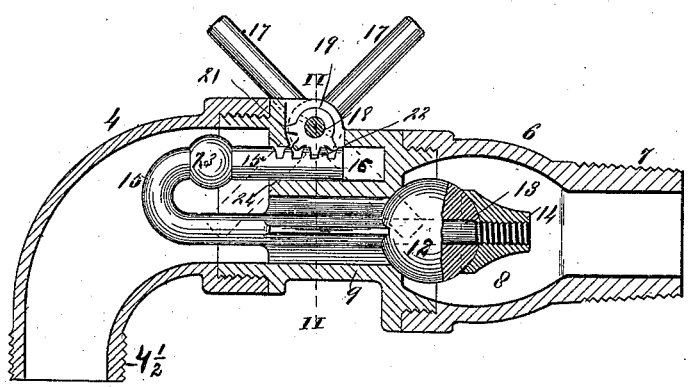
Fig. II.
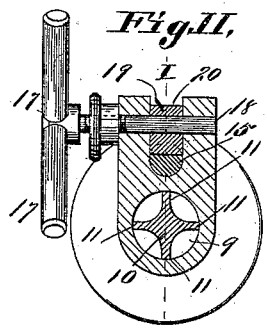
Fig. III.
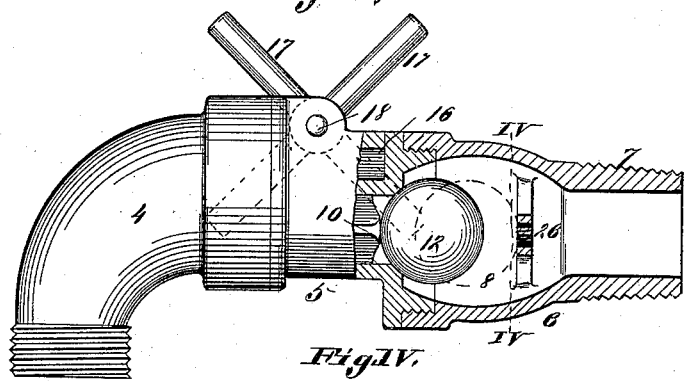
Fig. IV.
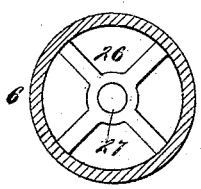
Attest:
E. Arthur.
S. H. Knight.
Inventor:
Frank B. Ray,
By Knight Bro
atty's

UNITED STATES PATENT OFFICE.

FRANK B. RAY, OF KANSAS CITY, MISSOURI.

COCK OR FAUCET.

SPECIFICATION forming part of Letters Patent No. 401,588, dated April 16, 1889.

Application filed June 28, 1888. Serial No. 278,481. (No model.)

*To all whom it may concern:*

Be it known that I, FRANK B. RAY, of Kansas City, in the county of Jackson and State of Missouri, a citizen of the United States, have invented a certain new and useful Improvement in Cocks or Faucets, of which the following is a full, clear, and exact description, reference being had to the accompanying drawings, forming part of this specification, and in which—

Figure I is a longitudinal section through my improved cock or faucet, showing the main valve partly in section and partly in elevation, and showing the stem and the small valve in elevation, the section being taken on line I I, Fig. II. Fig. II is a transverse section taken on line II II, Fig. I. Fig. III is part in section and part in side view, illustrating a slight modification. Fig. IV is a section taken on line IV IV, Fig. III, and looking toward the inner end of the cock or faucet.

My invention relates to an improvement in cocks or faucets; and my invention consists in features of novelty hereinafter fully described, and pointed out in the claims.

Referring to the drawings, I have shown the body or housing composed of three sections, 4, 5, and 6, the section 6 having a threaded end, 7, by which it is attached to the water-pipe, and in this section the valve-chamber 8 is formed. The section 5 has a water-passage, 9, and through this passage extends a stem, 10, of the valve, which is provided with guide-wings 11, by which it is held concentrically within the water-passage. To the inner end of this stem the valve 12 is preferably secured, as shown in Fig. I. The valve is composed of a ball or sphere with a central bore fitting over the end 13 of the stem, and held upon the stem by means of a nut, 14. The outer end of the stem has a return-bend, 15, that extends into and is covered by the section 4, and moves back and forth therein unobstructed. The end of the stem beyond the bend 15 fits in a chamber or opening, 16, in the part 5 of the housing above the water-passage 9. This end of the stem is engaged by an operating means, consisting, preferably, of a number of prongs or arms, 17, upon a shaft, 18, which passes through the part 5 of the body, and upon which is placed a segment, 19, fitting in a mortise, 20, of the part 5 of the housing, and having teeth or cogs 21, engaging teeth or cogs 22 on the return-bend 15 of the stem.

By turning the shaft 18 through means of the prongs or arms 17 in one direction the valve 12 is closed, as shown in Fig. I, and by turning the shaft in the other direction the valve 12 is opened, allowing a passage of the liquid through the cock, and in order to prevent any leakage through the chamber 16 and mortise 20, I secure a small valve, 23, on the return-bend 15 of the stem, which, when the valve 12 is opened, comes against a seat, 24, made in the part 5 of the body at the outer end of the chamber 16. With this arrangement I am enabled to prevent any leakage whatever in the chamber 16 and mortise 20. This valve 23 is particularly useful when a back-pressure is created within the faucet by the attachment of a hose to the threaded end $4\frac{1}{2}$ of the section 4, and when the cock is used for wash-stand and bath-tub purposes the valve might be dispensed with, as there would hardly be sufficient back-pressure to cause any leakage through the chamber 16 and mortise 20.

By arranging the valve 12 upon the guided stem and operating it through means of the return-bend of the stem I produce a cock or faucet which is not liable to get out of order, and, when closed, the valve is brought up snugly to its seat and avoids danger of the slightest leakage.

In some instances it might be desirable to have the valve 12 disconnected from the stem 10, as shown in Fig. III, and in this case I prefer to secure a spider, 26, within the chamber 8, against which the valve would be pressed by the stem when opened, to prevent its being moved about within the chamber by the passage of the water, the spider having a central opening, 27, to receive the valve, as shown by dotted lines in Fig. III.

I claim as my invention—

1. In a cock or faucet, the combination of the body having a water-passage and a chamber located over the water-passage, a valve-stem fitting in said passage, and a return-bend inclosed by the outer section of the body and extending into the chamber above the passage, a valve operated by the stem to control the flow of water through said passage, and means for moving the stem to operate the valve, substantially as and for the purpose set forth.

2. In a cock or faucet, the combination of the body having a water-passage and a chamber located over the passage, a stem having guide-wings fitting in said passage and having a return-bend fitting in said chamber and inclosed by the outer section of the body, a valve secured to the stem to control the flow of water through said passage, and means for engaging the stem to open and close the valve, said valve fitting upon an extension, 13, of the stem and secured to the said stem, substantially as and for the purpose set forth.

3. In a faucet, the combination of the section 9, having a water-passage through it and the chamber 16 therein, a U-shaped valve-stem having its legs fitting in said chamber and water-passage, means for reciprocating said stem, a valve on each of the legs of said stem, said valves being adapted to close said chamber and water-passage alternately, and a removable nozzle secured to said section 9, completely inclosing said valve-stem.

4. In a faucet, the combination, with the valve-chamber having a valve, 12, therein, the section 9, connected with said chamber and having the water-passage and chamber 16, and a U-shaped valve-stem having its legs inserted in said passage and chamber 16, adapted to unseat valve 12, of a valve, 23, on one leg of said stem adapted to close the chamber 16, and a nozzle or section secured to section 9 and completely inclosing said valve-stem, substantially as set forth.

FRANK B. RAY.

In presence of—
JAS. E. KNIGHT,
R. M. EADES.